United States Patent [19]

Andoh

[11] Patent Number: 5,265,188
[45] Date of Patent: Nov. 23, 1993

[54] CONTROL SYSTEM FOR CONTROLLING OBJECT AT CONSTANT STATE

[75] Inventor: Toshiyuki Andoh, Sagamihara, Japan

[73] Assignee: Ricoh Company, Ltd., Tokyo, Japan

[21] Appl. No.: 804,449

[22] Filed: Dec. 10, 1991

[30] Foreign Application Priority Data

Dec. 10, 1990 [JP] Japan ................. 2-411380
Mar. 18, 1991 [JP] Japan ................. 3-052094
Jun. 5, 1991 [JP] Japan ................. 3-133896

[51] Int. Cl.$^5$ ........................................ H02P 5/168
[52] U.S. Cl. ............................ 388/815; 388/907.5; 388/811; 318/609
[58] Field of Search ............... 388/906, 809–815, 388/911, 907.5, 632–634, 934; 318/635, 609–610

[56] References Cited

U.S. PATENT DOCUMENTS

| | | | |
|---|---|---|---|
| 4,019,107 | 4/1977 | Dixon et al. | 318/338 |
| 4,149,117 | 4/1979 | Wober | 388/815 |
| 4,203,061 | 5/1980 | Minakuchi | 388/812 |
| 4,254,368 | 3/1981 | Ido et al. | 318/603 |
| 4,271,382 | 6/1981 | Maeda et al. | 388/820 |
| 4,471,281 | 9/1984 | Uezumi et al. | 318/606 |
| 4,485,337 | 11/1984 | Sandusky | 388/812 |
| 4,498,034 | 2/1985 | Shirakawa | 388/820 |
| 4,605,885 | 7/1986 | Mitsuhashi | 318/609 X |
| 4,733,144 | 3/1988 | Bisseling | 318/609 X |
| 4,733,149 | 3/1988 | Culberson | 318/610 |

Primary Examiner—William M. Shoop, Jr.
Assistant Examiner—David Martin
Attorney, Agent, or Firm—Oblon, Spivak, McClelland, Maier & Neustadt

[57] ABSTRACT

A control system controls a motor so that a controlled speed is maintained at an object value supplied from an external unit. The control system includes: an operation block for obtaining a difference between the object value and the controlled speed; an integrating block for integrating the difference obtained by the operation block and for outputting an integrated value; a limiting block for outputting a limited value when the integrated value obtained by the integrating block is equal to or greater than the limited value and for outputting the integrated value from the integrating block as it is when the integrated value is less than the limited value; and a control block for maintaining the controlled speed of the motor at the object value based on the integrated value or the limited value output from the limiting unit.

14 Claims, 10 Drawing Sheets

FIG. 9
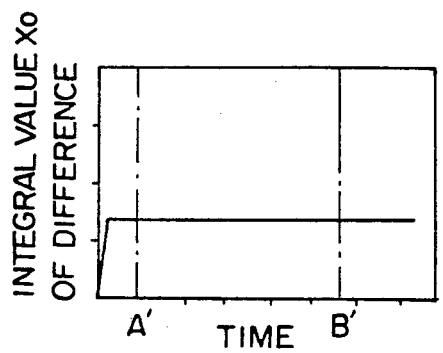
FIG. 10
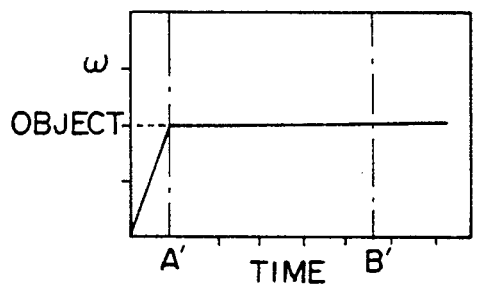
FIG. 12
| R | Xo limit |
|---|---|
| R1 | Xo $\ell_1$ |
| R2 | Xo $\ell_2$ |
| R3 | Xo $\ell_3$ |

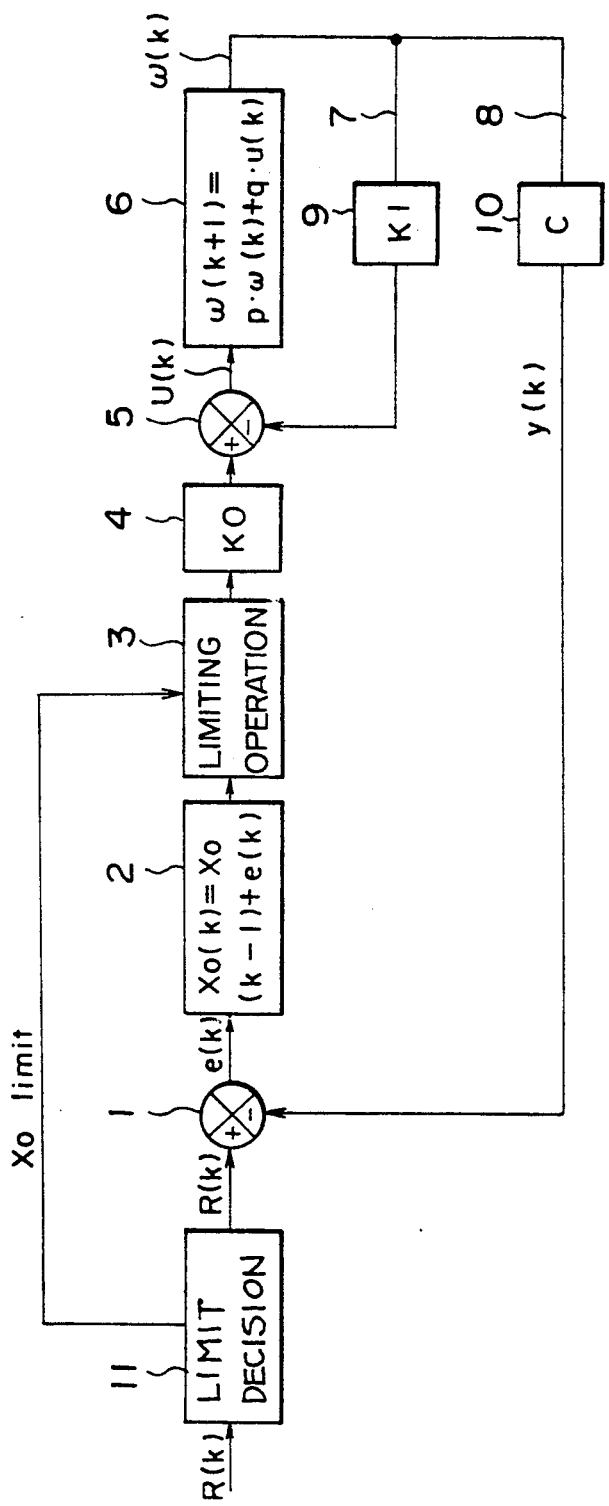
FIG. II

| COIL TEMP | OPTIMAL GAINS |
|---|---|
| $t_1$ | $K0_1$, $K1_1$ |
| $t_2$ | $K0_2$, $K1_2$ |
| $t_3$ | $K0_3$, $K1_3$ |

CONTROL SYSTEM FOR CONTROLLING OBJECT AT CONSTANT STATE

BACKGROUND OF THE INVENTION (1) Field of the Invention

The present invention generally relates to a control system for controlling an object at a constant state, and more particularly to a control system for controlling an object at a constant state which can be applied to a controller for controlling a motor so that a driving speed thereof is maintained at a constant value.

(2) Description of Related Art

Conventionally, an integral-type optimal regulator for accurately controlling a driving speed of a motor and the like has been proposed. The integral-type optimal regulator is disclosed, for example, in Japanese Patent Laid Open No. 1-240903. In the conventional integral-type optimal regulator, no response calculation of status variables is carried out after obtaining solutions for determining weighting of a performance function. The weighting of the performance function is determined after rough weighting is selected so as to be equal to a solution obtained in accordance with a PI-control. According to the above process, a selection standard used for determining the weighting of the performance function when the resolution of an optimal regulator is obtained becomes clear, so that a time required for determining the weighting of the performance function can be decreased.

A description will now be given of a controller for controlling a driving speed of a motor, the controller using the above integral-type optimal regulator with reference to FIGS. 1 through 6.

Referring to FIG. 1, which shows a system for controlling a motor which drives a carriage of an image scanner, the system has a microcomputer unit 21 including a microprocessor 22, a read only memory 23 (ROM) and a random access memory 24 (RAM). The system further includes an instruction generating circuit 25, a driving interface circuit 26, a driving circuit 27, a motor 28, an incremental-encoder 29, an interface circuit 30 and a carriage 31 of the image scanner. The microprocessor 22, the read only memory 23 and the random access memory 24 in the microcomputer unit 21 are respectively connected to each other by a bus 35.

The instruction generating circuit 25 outputs a speed instruction signal denoting a speed at which the motor 28 should be controlled. The speed instruction signal output from the instruction generating circuit 25 is supplied via the bus 35 to the microcomputer unit 21. The incremental encoder 29 outputs pulses in synchronism with a rotation of the motor 28. The interface circuit 30 has a counter which is operated based on the pulses output from the incremental encoder 29. The driving interface circuit 26 converts calculation results obtained by the microcomputer unit 21 into a pulse-shaped control signal. The driving circuit 27 has a power device, such as a power transistor, and the power device is driven in accordance with the pulse-shaped control signal supplied from the driving interface circuit 26, so that the driving circuit 27 controls an applied voltage to the motor 28 based on the pulse-shaped control signal. The motor 28 is driven by the driving circuit 27 so as to be maintained at a predetermined driving speed. The driving speed of the motor 28 is detected by the incremental-encoder 29 and the interface circuit 30. The detected driving speed is supplied via the bus 35 to the microcomputer unit 21. The motor 28 is coupled to the carriage of the image scanner so that the carriage is moved at a predetermined speed.

The microcomputer unit 21 can be formed in one chip which also includes the instruction generating circuit 25, the driving interface circuit 26 and the interface circuit 30.

The microcomputer unit 21 has a function of the integral-type optimal regulator. A description will now be given of the function of the integral-type optimal regulator.

Since a self-inductance L of a direct-current motor is generally small, the self-inductance L can be ignored in a state equation which represents a state of the direct-current motor. Thus, the state equation can be denoted as follows.

$$\dot{\omega} = -[KT^2/(Ra \cdot I_n)]\omega + [KT/(Ra \cdot I_n)]u \qquad (1)$$

where $\omega$ is an angular speed of the motor, $\dot{\omega}$ is an angular acceleration of the motor, KT is a torque constant of the motor, $I_n$ is inertia of the motor and a load of the motor, u is an input voltage of the motor, and Ra is a resistance of the armature of the motor.

An output equation is denoted by the following formula (2).

$$y = c \cdot \omega \qquad (2)$$

where c is a constant.

In a discrete system, the state equation can be denoted by the following formula (3), $$\omega(k+1) = p \cdot \omega(k) + q \cdot u(k) \qquad (3)$$

and the output equation can be denoted by the following formula (4).

$$y(k) = c \cdot \omega(k) \qquad (4)$$

In the above formula (3), p and q are constants determined based on the sampling period.

FIG. 2 shows function blocks of the integral-type optimal regulator system. Referring to FIG. 2, the integral-type optimal regulator has operation parts 41 and 44, an integration part 42, a first feed-back gain part 43 (K0), a motor block 45, feed-back loops 46 and 47, a second feed-back gain part 48 (K1) and a constant part 49. The operation part 41 calculates a difference e(k) between an object value R(k) and a controlled value y(k). The integration part 42 successively integrates differences e(k) output from the operation part 41. The integrated value obtained by the integration part 42 is multiplied by a feed-back gain K0 in the first feed-back gain part 43. A state of the motor 45 is described by the state equation indicated by the formula (3). The angular speed $\omega(k)$ obtained by the motor block 45 is multiplied by a constant c in the constant part 49 so that the controlled value y(k) is fed back via the feed-back loop 47 to the operation part 41. The angular speed $\omega(k)$ is also multiplied by a feed-back gain K1 in the second feed-back gain part 48 so that a value obtained by the multiplication in the second feed-back gain part 48 is fed back via the feed-back loop 46 to the operation part 44. The operation part 44 calculates a difference between the output of the first feed-back gain part 43 and the output of the second feed-back back gain part 48 so that a control signal u(k) is supplied from the operation part 4 to the motor block 45. As a result, the motor 28 is controlled at a predetermined speed in the motor block 45.

The object value R(k) corresponds to a speed at which the motor 28 should be controlled and is determined based on the speed instruction signal output from the instruction generating circuit 25 shown in FIG. 1. The controlled value y(k) corresponds to the driving speed of the motor 28 which is detected by the incremental-encoder 29 and the interface circuit 30. A process for detecting the driving speed of the motor 28 will be described later. K0 set in the first feed-back gain part 43 and K1 set in the second feed-back gain part 48 are respectively optimal gain vectors determined based on the solution of the Riccati equation.

A description will now be given of a process for obtaining the optimal gain vectors.

The following state equation (5) is made based on the above formulas (3) and (4).

$$\begin{bmatrix} y(k+1) \\ s(k+1) \end{bmatrix} = \begin{bmatrix} 1 & c \cdot p \\ 0 & p \end{bmatrix} \begin{bmatrix} y(k) \\ s(k) \end{bmatrix} + \begin{bmatrix} c \cdot q \\ q \end{bmatrix} d(k) \quad (5)$$

where $s(k) = \omega(k) - \omega(k-1)$, and $d(k) = u(k) - u(k-1)$. When $P_1$ and $Q_1$ are respectively set as follows, $$\begin{bmatrix} 1 & c \cdot p \\ 0 & p \end{bmatrix} = P_1 \quad (6)$$

$$\begin{bmatrix} c \cdot q \\ q \end{bmatrix} = Q_1 \quad (7)$$

the performance function J regarding a control of the motor 28 is obtained as follows.

$$J = \sum_{k=0}^{\infty} [y^2(k+1) + W \cdot d^2(k)] \quad (8)$$

where W is a weighting coefficient and does not have a negative value. A control input d(k) is calculated so that the above performance function J is minimized.

The Riccati equation is described by the following formula (9).

$$H(k+1) = P_1' \cdot H(k) \cdot P_1 - P_1' \cdot H(k) \cdot Q_1 \cdot (W + Q_1' \cdot H(k) \cdot Q_1) + W_x \quad (9)$$

When a steady-state solution of the Riccati equation (9) is defined as H, the optimal gain vector $G = (K0, K1)$ can be obtained by the following formula (10);

$$G = (W + Q_1' \cdot H(k) \cdot Q_1)^{-1} \cdot Q_1' \cdot H \cdot P_1 \quad (10)$$

where $P_1'$ and $Q_1'$ are respectively transposes of matrixes of $P_1$ and $Q_1$, and $(\ )^{-1}$ denotes an inverse matrix.

A description will now be given of a process for detecting a speed based on an output of the incremental-encoder 29. The process is carried out in the interface circuit 30 shown in FIG. 1.

The interface circuit 30 uses each pulse output from the incremental-encoder 29 as an interruption signal sent to the microcomputer unit 21. The interface circuit 30 has a counter for counting a reference clock signal. The pulses (OB) output from the incremental-encoder 29 and the reference clock signal (CLK) are respectively shown in FIG. 3. The counter provided in the interface circuit 30 decrements a count value from an initial value (e.g. 0FFFFH) in synchronism with the reference clock signal (CLK). When the interrupt signal is supplied to the microcomputer unit 21 at an edge 50 of one of the pulses (OB) output from the incremental-encoder 29, an interrupt routine shown in FIG. 4 is carried out in the microcomputer unit 21. Referring to FIG. 4, the count value which has been set in the counter in the cycle $T_{n-1}$ is latched in a storage register provided in the interface circuit 30, in step 1. The count value latched in the storage register in the cycle $T_{n-1}$ is stored in the random access memory 24 shown in FIG. 1, in step 2. Then the counter is initialized to the initial value (0FFFFH) and decrements the count value in synchronism with the reference clock signal (CLK) in the next cycle $T_n$, in step 3. One interruption process in the microcomputer unit 21 is finished after the counter starts to decrement the count value in step 3. When the interrupt signal is supplied again to the microcomputer unit 21 at an edge 51 of one of the pulses output from the incremental-encoder 29, the next interruption process in the next cycle $T_{n+1}$ is carried out in accordance with the flow chart (the steps 1 through 3) shown in FIG. 4. Then the above interruption process is repeatedly carried out at every edge of the pulses output from the incremental-encoder 29.

While the above interruption process is being repeatedly carried out, the angular speed $\omega(k)$ is calculated in accordance with the following formula (11);

$$\omega(k) = [K/(T_{CLK} \cdot NE)] \cdot (1/n) \quad (11)$$

where $T_{CLK}$ is a period of the reference clock signal (CLK), NE is a number of the divisions in the incremental-encoder 29, n is a count value in the counter [= (initial count value 0FFFFH)-(decremented count value)], and K is a unit conversion constant of the angular speed.

In the above integral-type optimal regulator, the difference e(k) between the object value R(k) and the controlled value y(k) is integrated ($x_o$) to rapidly make the difference decrease to zero. Thus, the difference e(k) in an initial state in which the speed of the motor 28 starts to increase from zero is very large in comparison with that in a steady state in which the motor 28 is steadily driven at a predetermined speed, as shown in FIG. 5. As a result, a large overshoot of the speed is generated when driving of the motor 28 is started, as shown in FIG. 6. In FIG. 5, the difference e(k) reaches the maximum value at a time A. In FIG. 6, overshoot is generated so that the angular speed exceeds the object value at the time A. In FIGS. 5 and 6, after the overshoot is smoothed, the motor is steadily controlled. When the gains K0 and K1 are respectively increased to improve the responsiveness of the system, overshoot is noticeably generated. Thus, conventionally, the gains are set at low values to decrease the overshoot, so that the responsiveness of the system deteriorates.

The system having the above problem is limited to the integral-type optimal regulator. However, general integral-type regulator systems have the same problem.

In addition, while the motor 28 is being driven, a temperature of a coil of the motor is increased so that the resistance Ra of the armature is varied. When the resistance Ra of the armature is varied, coefficients $[-KT^2/(Ra \cdot I_n)]$ and $[KT/(Ra \cdot I_n)]$ in the state equation (1) are respectively varied. In this case, as coefficients in the Riccati equation (9) are also varied, the gains in the regulator differ from the optimal values. Thus, when the motor 28 is controlled by use of the gains obtained before the motor 28 is driven, accurate control of the motor 28 cannot be carried out.

SUMMARY OF THE INVENTION

Accordingly, a general object of the present invention is to provide a novel and useful regulator for maintaining a system at a constant state in which the disadvantages of the aforementioned prior art are eliminated.

A more specific object of the present invention is to provide an integral-type control system for controlling an object at a constant state in which the overshoot of the controlled value can be decreased.

The above objects of the present invention are achieved by a control system for controlling an object so that a controlled value indicating a state of the object is maintained at an object value supplied from an external unit, the control system comprising: operation means for obtaining a difference between the object value and the controlled value; integrating means, coupled to the operation means, for integrating the difference obtained by the operation means and for outputting an integrated value; limiting means, coupled to the integrating means, for outputting a limited value when the integrated value obtained by the integrating means is equal to or greater than the limited value and for outputting the integrated value from the integrating means as it is when the integrated value is less than the limited value; and control means, coupled to the limiting means and the object, for maintaining the controlled value of the object at the object value based on the integrated value or the limited value output from the limiting means.

According to the present invention, as the integrated value of the differe the object value and the controlled value is limited to the limited value, the overshoot of the controlled value of the object can be decreased.

Another object of the present invention is to provide a control system for controlling an object at a constant state in which the system can be accurately maintained at the constant state.

This object of the present invention is achieved by a control system for controlling an object so that a controlled value indicating a state of the object is maintained at an object value supplied from an external unit, the control system comprising: control data generation means for generating control data based on the object value, the controlled value and a feed-back gain; driving means, coupled to the control data generation means, for driving the object in accordance with the control data generated by the control data generation means; detection means, coupled to the object, for detecting a state of the object; and decision means, coupled to the control data generating means and the detection means, for determining an optimal gain which is optimal for controlling the object, wherein the optimal gain is used as the feed-back gain in the control data generation means.

According to the present invention, as the control of the object is always carried out in a state where the optimal gain is used, the controlled value of the object can be accurately maintained at the object value.

Additional objects, features and advantages of the present invention will becomes apparent from the following detailed description when read in conjunction with the accompanying drawings.

BRIEF DESCRIPTION OF THE DRAWINGS

FIG. 9 is a graph illustrating an integrated value of a difference between an object value and a controlled value in the system shown in FIG. 7.

FIG. 10 is a graph illustrating a variation of an angular speed of the motor in the system shown in FIG. 7.

FIG. 11 is a block diagram illustrating functions of an integral-type optimal regulator according to a second embodiment of the present invention.

FIG. 12 is a table illustrating a relationship between object values and supremum values of the integrated value.

DESCRIPTION OF THE PREFERRED EMBODIMENTS

A description will now be given of a first embodiment of the present invention with reference to FIGS. 7 through 10.

Figure 1:
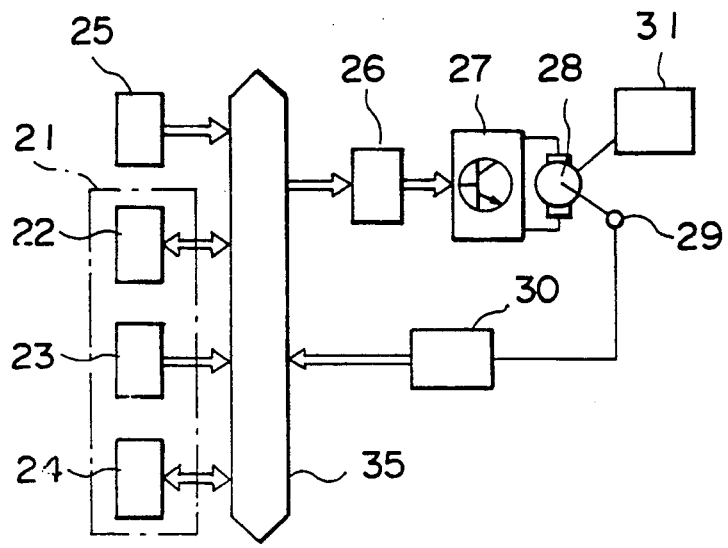
FIG. 1 is a block diagram illustrating a control system for controlling a motor driving a carriage of the scanner at a constant speed.
Figure 2:
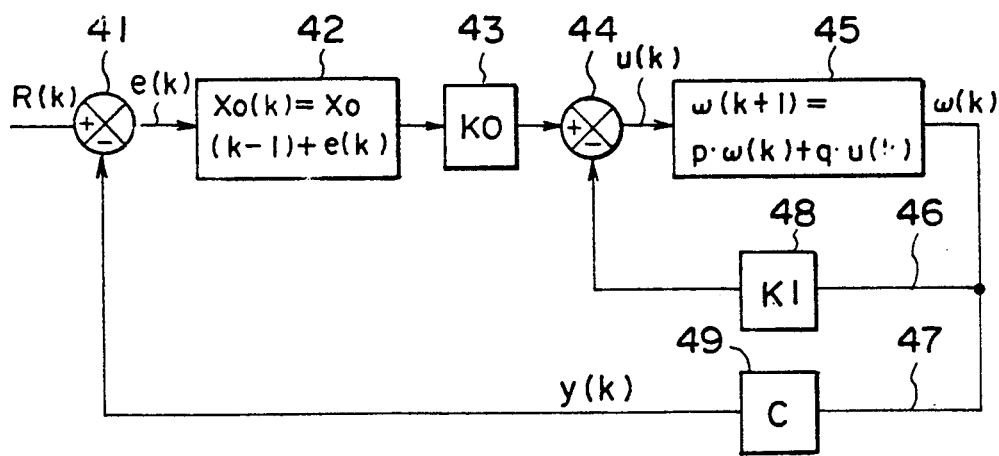
FIG. 2 is a block diagram illustrating functions of the control system shown in FIG. 1.
Figure 3:
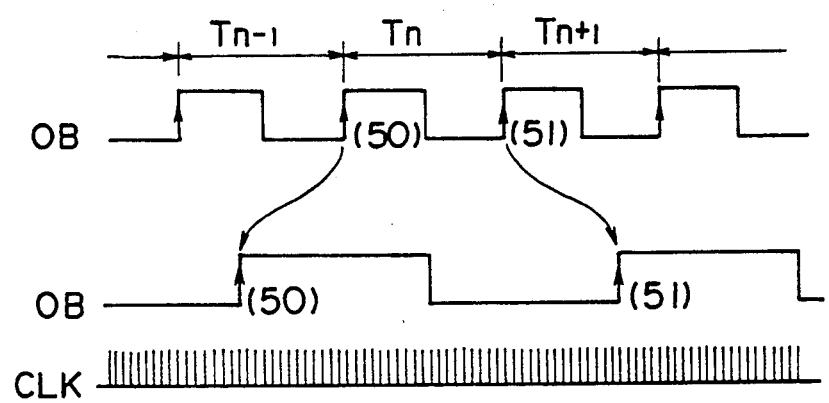
FIG. 3 is a timing chart illustrating a relationship between pulses output from an incremental-encoder shown in FIG. 1 and a reference clock signal.
Figure 4:
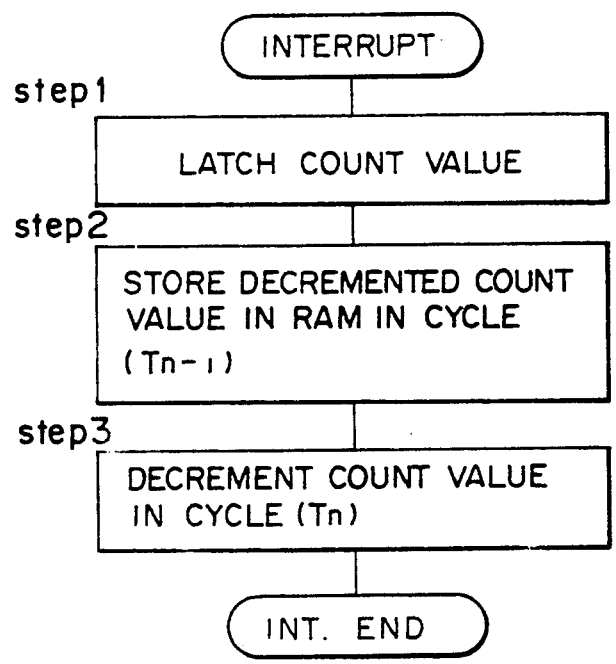
FIG. 4 is a flow chart illustrating an interrupt process carried out in a microcomputer unit shown in FIG. 1.
Figure 7:
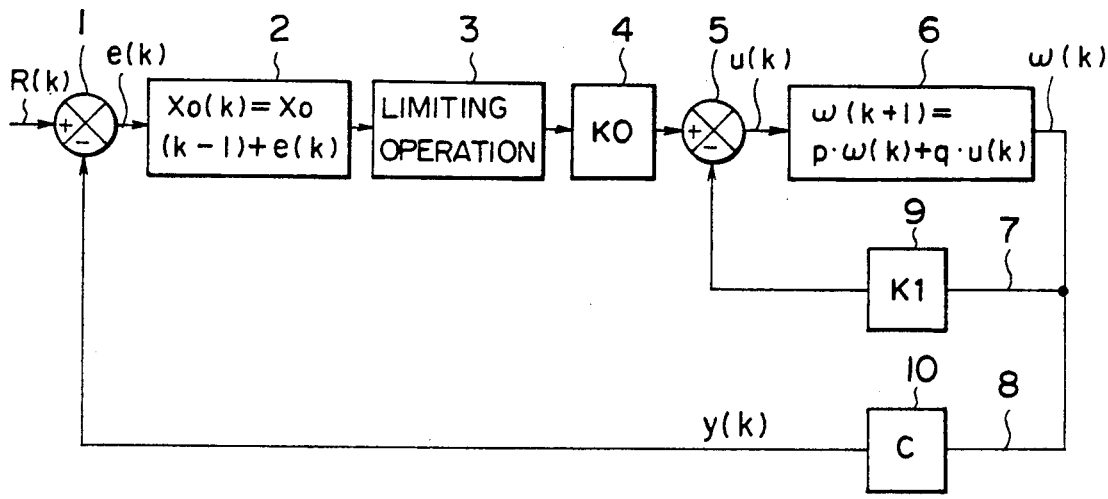
FIG. 7 is a block diagram illustrating functions of an integral-type optimal regulator according to a first embodiment of the present invention.

Referring to FIG. 7, which shows functions of the integral-type optimal regulator according to a first embodiment of the present invention, the integral-type optimal regulator has operation parts 1 and 5, an integration part 2, a first feed-back gain part 4, a motor block 6, feed-back loops 7 and 8, a second feed-back gain part 9 and a constant part 10, in the same manner as that in shown in FIG. 2. The integral-type optimal regulator further includes a limiting operation part 3 provided between the integration part 2 and the first feedback gain part 4. A control system having the above functions has the same structure as that shown in FIG. 1. The speed of the motor is detected in accordance with the same process as that described above.

The angular speed $\omega(k)$, detected by the incremental-encoder (not shown) in the motor block 6, is multiplied by a constant c in the constant part 10 so that the controlled value y(k) is obtained. The controlled value y(k) is fed back via the feed-back loop 8 to the operation part 1. In addition, the angular speed $\omega(k)$ is multiplied by a feed-back gain K1 in the second feed-back part 9 and fed back to the operation part 5 via the feed-back loop 7. The operation part 1 calculates a difference e(k) between an object value R(k) and the controlled value y(k). References e(k) successively output from the operation part 1 are integrated by the integration part 2, so that the integrated value obtained by the integration part 2 is supplied to the limiting operation part 3. The limiting operation part 3 outputs $x_o$. The output $x_o$ of the limiting operation part 3 is multiplied in the first feed-back gain part 4 by a feed-back gain K0. The output from the first feed-back gain part 4 is supplied to the operation part 5. The operation part 5 calculates a difference between the output of the first feed-back gain part 4 and the output of the second feed-back gain part 9 so that control data u(k) is obtained. The motor block 6 controls the speed of the motor based on the control data u(k) supplied from the operation part 5.

A description will now be given of a process of the limiting operation part 3 with reference to FIG. 8.

A maximum value $x_o$(limit) of the integrated value $x_o$ permitted in this system is previously stored in the read only memory 23 (ROM) or the random access memory 24 (RAM) shown in FIG. 1.

Figure 8:
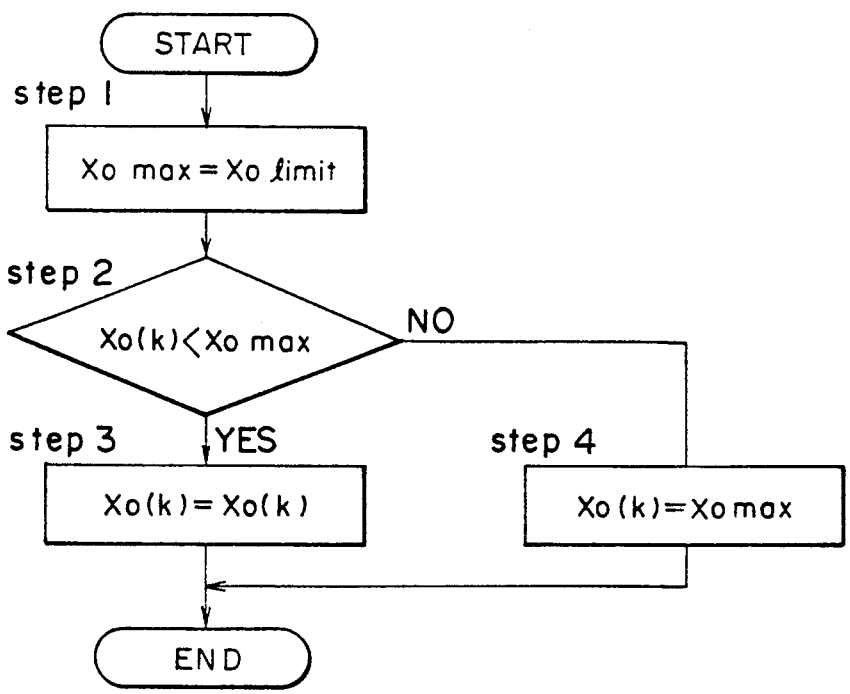
FIG. 8 is a flow chart illustrating a process carried out in a limiting operation part shown in FIG. 7.

Referring to FIG. 8, a variable $x_o$ (max) is defined as the maximum value $x_o$ (limit) which has been stored in the above memory, in step 1. Step 2 determines whether or not the integrated value $x_o(k)$ obtained by the integration part 2 is less than the variable $x_o$(max) equal to the maximum value $x_o$(limit). When the integrated value $x_o(k)$ is less than the variable $x_o$(max), step 3 outputs the integrated value $x_o(k)$ as it is. When step 2 determines that the integrated value $x_o(k)$ is equal to or greater than the variable $x_o$(max), step 4 outputs the variable $x_o$(max) equal to the maximum value $x_o$(limit) as the integrated value $x_o(k)$. After step 3 or 4 is completed, the process in the limiting operation part 3 is completed. That is, the integrated value $x_o(k)$ supplied to the operation part 4 is limited, by the limiting operation part 3, to a value less than or equal to the maximum value $x_o$(limit).

The above operation, in accordance with the flow chart shown in FIG. 8, is carried out in the microcomputer unit 21 shown in FIG. 1.

Figure 5:
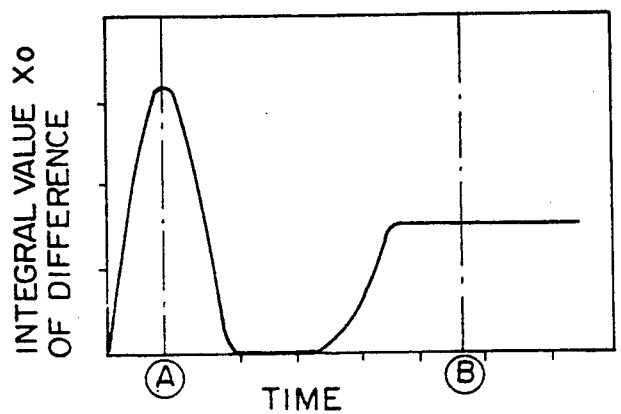
FIG. 5 is a graph illustrating an integrated value of a difference between an object value and a controlled value.
Figure 6:
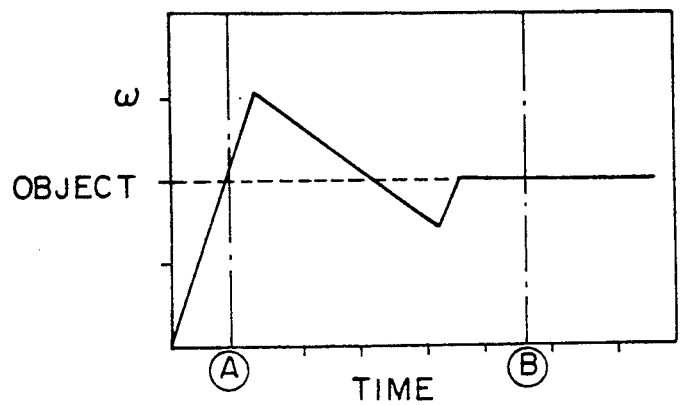
FIG. 6 is a graph illustrating a variation of an angular speed of the motor.

The results of a computer simulation of the above control system are shown in FIGS. 9 and 10. FIG. 9 shows a response of the integrated value $x_o$ of the difference. FIG. 10 shows a response of the angular speed of the motor. The integrated value $x_o$ is limited to the maximum value $x_o$(limit) immediately before a time A', as shown in FIG. 9, so that the overshoot of the controlled value (the angular speed of the motor) is considerably less than that in the conventional case shown in FIG. 6, as shown in FIG. 10. In FIGS. 9 and 10, a time A' corresponds to the time A in FIGS. 5 and 6, and a time B' corresponds to the time B in FIGS. 5 and 6. Overshoot of the controlled value (the angular speed of the motor) starts from time A'(A). After the overshoot is smoothed, the steady-state starts, so that the motor is steadily controlled at time B. In this case the maximum value $x_o$(limit) is set at a value equal to an integrated value obtained at time B, in the steady-state, in the conventional control system which has no function for limiting the integrated value $x_o$.

According to the above control system (the integral-type optimal regulator), as the integrated value of the difference is limited to the maximum value $x_o$, the overshoot of the controlled value can be removed and the difference between the object value and the controlled value can be reduced to approximately zero in the steady-state.

A description will now be given of a second embodiment of the present invertion with reference to FIGS. 11 and 12.

In FIG. 11, which shows functions of the integral-type optimal regulator according to a second embodiment of the present invention, those parts which are the same as those shown in FIG. 7 are given the same reference numbers. In this control system of the integral-type optimal regulator, a plurality of object values can be supplied thereto, so that this control system has a plurality of maximum values, each of which corresponds to one of the object values.

Referring to FIG. 11, the control system has the operation parts 1 and 5, the integration part 2, the limiting operation part 3, the first feed-back gain part 4, the motor block 6, the feed-back loops 7 and 8, the second feed-back gain part 9 and the constant part 10, as the same manner as that shown in FIG. 7. The control system further includes a limit decision part 11 which is coupled to the operation part 1 and the limiting operation part 3. The limit decision part 11 has a table, for example, as shown in FIG. 12, stored in the read only memory 23 (ROM). The table indicates a relationship between the object values R and the maximum values $x_o$(limit).

When the object value R(k) is input to the limit decision part 11, the limit decision part 11 selects the maximum value $x_o$ corresponding to the input object value R(k) with reference to the table stored in the read only memory 23 (ROM). The object value R(k) is supplied, as it is, to the operation part 1 via the limit decision part. The maximum value $x_o$ selected in the limit decision part 11 is supplied to the limiting operation part 3. The limiting operation part 3 carries out the process in accordance with the flow chart shown in FIG. 8. In the process shown in FIG. 8, the variable $x_o$(max) is defined as the maximum value $x_o$(limit) supplied from the limit decision part 11. Control of the motor is then carried out in the same manner as that in the system shown in FIG. 7.

In the table shown in FIG. 12, the object values $R_1$, $R_2$, $R_3$, . . . are arranged in either decreasing order of absolute value or increasing order thereof. When there is no object value equal to that input to the limit decision part 11 in the table, an object value closest to the input object value R(k), and not less than the input object value R(k), is selected from the table. The maximum value corresponding to the selected object value is then output from the limit decision part 11.

The above process in the limit decision part 11 is carried out by the microcomputer unit 21.

According to the above system having the decision part 11, even if various object values are supplied thereto, control of the motor can be performed without overshoot of the controlled value with respect to each of the object values, and the difference between each of the object values and the controlled value can be approximately zero in the steady-state. In addition, as the relationship between the object values and the maximum values of the integrated value has been previously stored in the read only memory 23 (ROM), time required for the process in the limit decision part 11 can be decreased.

A description will now be given of a modification of the second embodiment described above with reference to FIG. 13.

Figure 13:
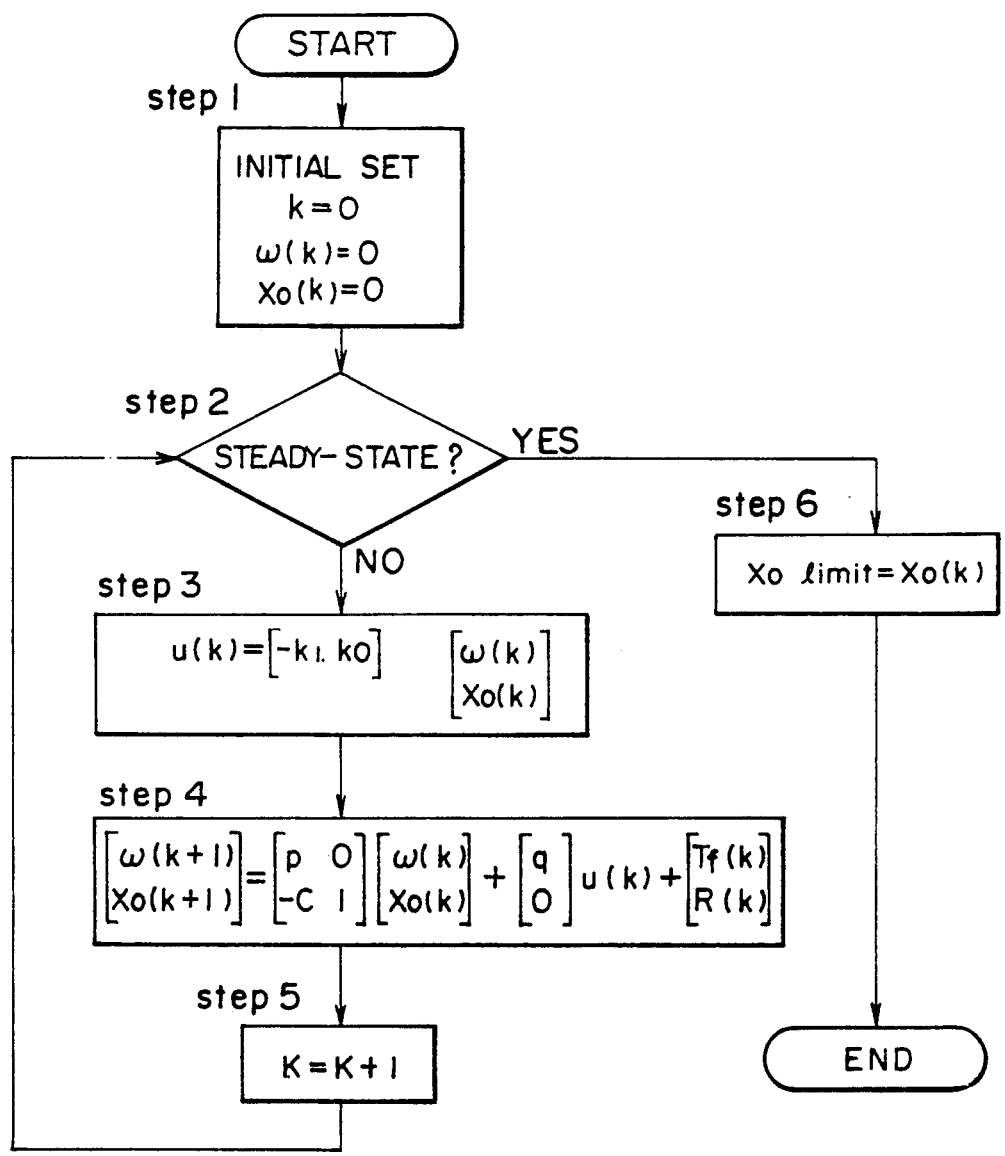
FIG. 13 is a flow chart illustrating a process carried out in a limit decision part shown in FIG. 11.

In this modification the limit decision part 11 determines the maximum value of the integrated value in accordance with a process shown in FIG. 13. This process is carried out, for example, by a computer simulation. Referring to FIG. 13, when the limit decision part 11 is activated by the input of the object value R(k), step 1 initializes parameters $k$, $\omega(k)$ and $x_o(k)$ (e.g. $k=0$, $\omega(k)=0$, $x_o=0$). Then control of the motor with respect input object value is carried out in a state where the function of the limiting operation part 3 is cancelled. In this state, the process in the limit decision part 11 is continued. Step 2 determines whether or not the angular speed $\omega$ is in the steady-state. For example, when a difference between $\omega(k)$ at the cycle k and $\omega(k-1)$ at the cycle $(k-1)$ is approximately equal to zero, it is determined that the angular speed $\omega(k)$ of the motor is in the steady-state. When the cycle number k reaches a predetermined large value, it can also be determined that the angular speed $\omega(k)$ is in the steady-state. When step 2 determines that the angular speed $\omega(k)$ is not in the steady-state, the process goes on to steps 3 and 4. Step 3 calculates the control data u(k) supplied to the motor block in accordance with the following determinant.

$$u(k) = [-k1, k0] \begin{bmatrix} \omega(k) \\ x_o(k) \end{bmatrix}$$

Then step 4 calculates $\omega(k+1)$ and $x_0(k+1)$ in accordance with the following determinant:

$$\begin{bmatrix} (k+1) \\ x_0(k+1) \end{bmatrix} = \begin{bmatrix} p & 0 \\ -c & 1 \end{bmatrix} \begin{bmatrix} (k) \\ x_0(k) \end{bmatrix} + \begin{bmatrix} q \\ o \end{bmatrix} u(k) + \begin{bmatrix} T_f(k) \\ R(k) \end{bmatrix}$$

where $T_f(k)$ is friction torque of the motor 28 and the carriage 31 shown in FIG. 1.

After step 5 increments k by one the process proceeds back to step 2. After this, the above steps 2, 3, 4 and 5 are repeatedly carried out. In this state, when step 2 determines that the angular speed $\omega(k)$ is in the steady-state, step 6 sets the $x_0(k)$ which has been obtained in step 4 to be the maximum value $x_0$(limit). The process in the limit decision part 11 is then completed. When the process is completed, the control of the motor is carried out in a state where the integrated value is limited to the supremum value $x_o$ obtained in accordance with the above process. Further, the supremum value $x_o$ corresponding to an input object value R(k) obtained in the limit decision part 11 is stored in the random access memory 24 (RAM) shown in FIG. 1.

Next, when an object value corresponding to the maximum value $x_o$ which has been stored in the random access memory 24 (RAM) is supplied to the limit decision part 11, the limit decision part 11 reads out the maximum value $x_o$ corresponding to the input object value from the random access memory 24 (RAM), and supplies it to the limiting operation part 3. Control of the motor is then carried out in the same manner as that described in FIG. 11. That is, the integral-type optimal regulator controls the motor to be in a state where the integrated value of the difference between the input object value and the controlled value is limited to the maximum value $x_o$ stored in the random access memory 24 (RAM).

If there is no maximum value $x_o$ corresponding to an input object value R(k) in the random access memory 24 (RAM), the limit decision part 11 calculates a new maximum value $x_o$ corresponding to the input object value R(k) in accordance with the process shown in FIG. 13. The new maximum value $x_o$ is then also stored in the random access memory 24 (RAM).

According to the above modification, as the maximum value of the integrated value is calculated whenever a new object value is supplied to the control system, control of the motor can be carried out in a state where the integrat,ed value is always limited to an optimal maximum value. Thus, even if the object values are varied, overshoot of the controlled value can be definitely prevented.

In the above first and second embodiments, the supremum value is determined as a value approximately equal to an integrated value obtained, in the steady-state, in the conventional control system which has no function for limiting the integrated value $x_o$. Alternatively, the supremum value can be determined as a value slightly greater than the integrated value obtained in the steady-state in the control system which has no function for limiting the integrated value $x_o$.

A description will now be given of a third embodiment of the present invention with respect to FIGS. 14 through 16. In the third embodiment, the gains K0 and K1 are varied based on a temperature of a coil in the motor.

Figure 15:
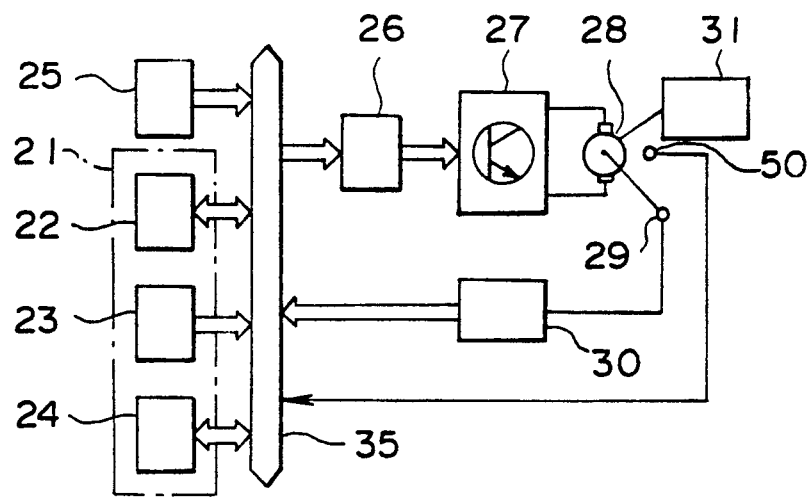
FIG. 15 is a block diagram illustrating a control system to which the integral-type optimal regulator may be applied.

FIG. 15 shows a system for controlling a motor which drives a carriage of an image scanner. In FIG. 15, those parts which are the same as those shown in FIG. 1 are given the same reference numbers.

Referring to FIG. 15, the system has the microcomputer unit 21 including a microprocessor 22, a read only memory 23 (ROM) and a random access memory 24 (RAM), the instruction generating circuit 25, the driving interface circuit 26, the driving circuit 27, the motor 28, the incremental-encoder 29, the interface circuit 30 and the carriage 31 of the image scanner in the same manner as that shown in FIG. 1. The system further includes a temperature sensor 50, such as a thermistor. The temperature sensor 50 is mounted in the coil of the motor 28. The temperature sensor 50 is used for detecting a temperature of the coil of the motor 28 in accordance with instructions supplied from the microcomputer unit 21. The temperature senso 50 is connected to the bus 35 so that detection signals output from the temperature sensor 50 are supplied via the bus 35 to the microcomputer unit 21.

Figure 16:
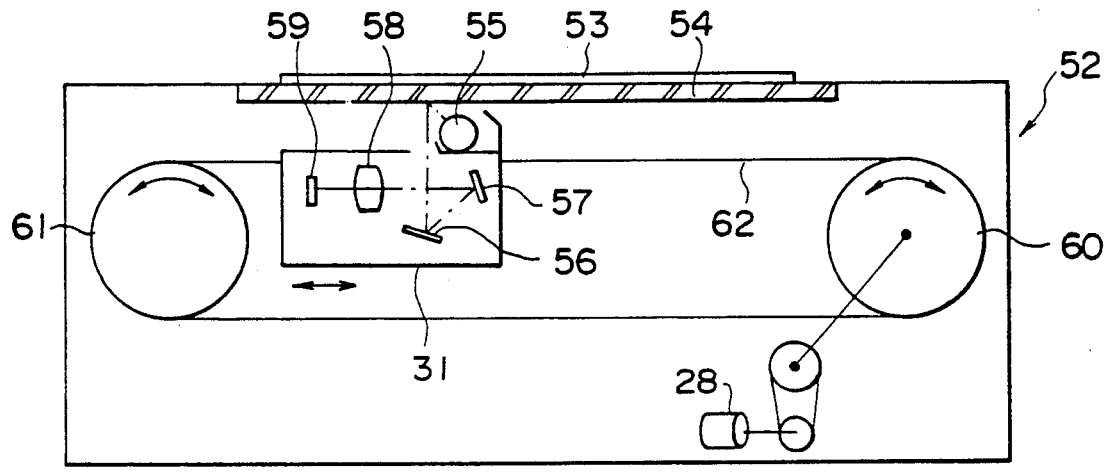
FIG. 16 is a diagram illustrating an example of a structure of an image scanner having a motor which is controlled by the system shown in FIG. 15.

The image scanner having the carriage driven by the motor 28 is constituted, for example, as shown in FIG. 16. Referring to FIG. 16, the scanner 52 has a platen glass 54 on which a document 53 may be set, a carriage 31, and a mechanism for moving the carriage 31. The carriage 31 is arranged under the platen glass 54 so as to be capable of moving in a horizontal direction indicated by an arrow in FIG. 16. The carriage 31 includes a lamp 55 for irradiating the document 53 on the platen glass 54, reflection mirrors 56 and 57, an imaging lens 58 and a CCD-line-sensor 59. A light, emitted from the lamp 55 and reflected by the surface of the document, passes through the reflection mirrors 56 and 57 and the imaging lens 58, and is projected onto the CCD-line-sensor 59. The mechanism for moving the carriage 31 includes the motor 28 and a driving pulley 60 which is driven by the motor 28, a follower pulley 61 and coupling wire 62. The driving pulley 60 and the follower pulley 61 are coupled to each other by the coupling wire 62 so as to be rotated together in the same direction. The carriage 31 is mounted on a part of the coupling wire 62, so that the carriage 31 moves in the horizontal direction when the motor 28 drives the driving pulley 60. When the carriage 31 is moved in the horizontal direction under the platen glass 54, the document 53 is scanned in a sub-scanning direction. The size magnification obtained by an optical system mounted on the carriage 31 can be set at a predetermined value.

Figure 14:
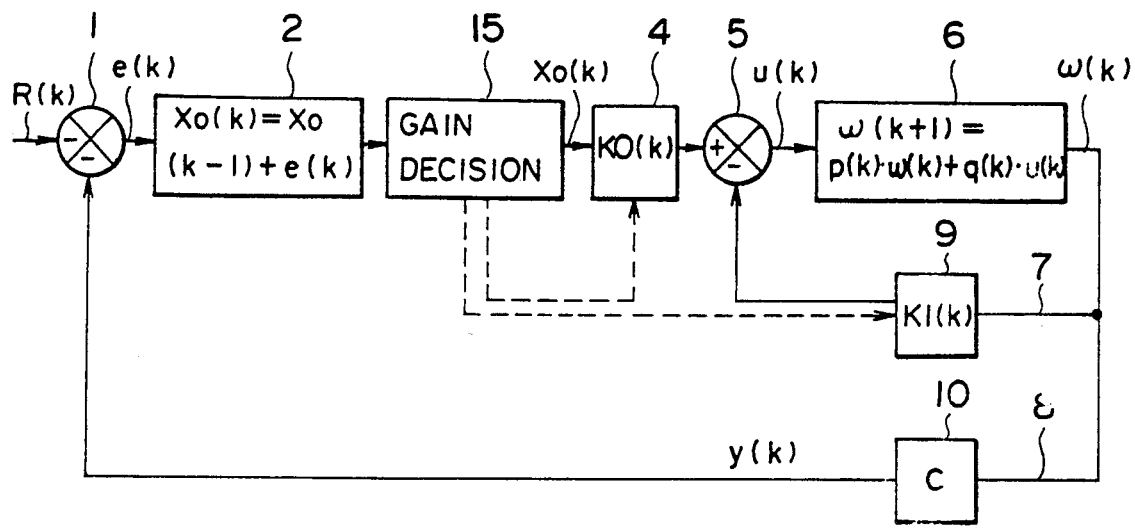
FIG. 14 is a block diagram illustrating functions of an integral-type optimal regulator according to a third embodiment of the present invention.

FIG. 14 shows functions of the control system of the integral-type optimal regulator which controls a speed of the motor 28 driving the carriage 31 of the scanner 52. In FIG. 14, those parts which are the same as those shown in FIGS. 7 and 11 are given the same reference numbers.

Referring to FIG. 14, the control system has the operation parts 1 and 5, the integration part 2, the first feed-back gain part 4, the motor block 6, the feed-back loops 7 and 8, the second feed-back gain part 9 and the constant part 10, in the same manner as that shown in FIG. 7. The control system shown in FIG. 14 further includes a gain decision part 15. The gain decision part 15 determines feed-back gains based on the detection signal supplied from the temperature sensor 50. The function of the gain decision part 15 is also constituted in the microcomputer unit 21.

Figure 17:
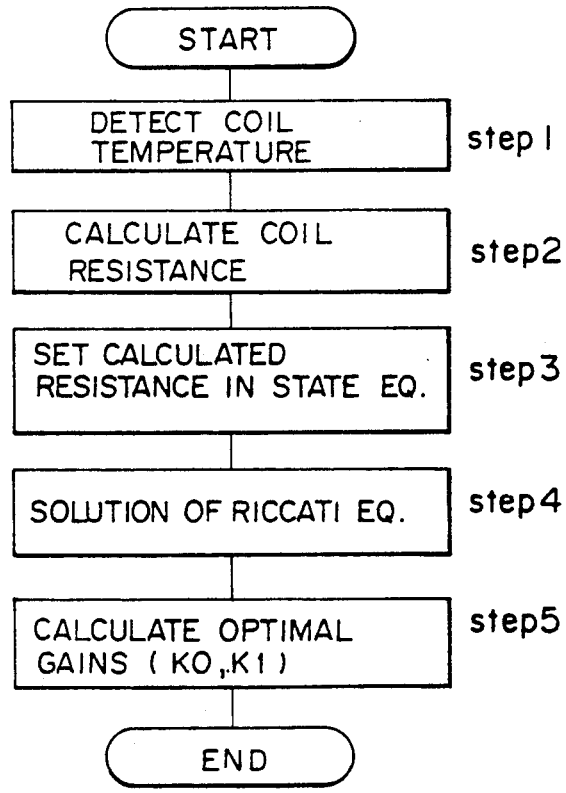
FIG. 17 is a flow chart illustrating a process carried out in a gain decision part shown in FIG. 14.

The gain decision part 15 carries out a process in accordance with a flow chart shown in FIG. 17. When the integrated value $x_o$ of the difference between the input object value and the controlled value is supplied from the integration part 2 to the gain decision part 15 the process shown in FIG. 17 starts. Step 1 detects a temperature of the coil of the motor 28 based on the detection signal supplied from the temperature sensor 50. Step 2 calculates a resistance of the coil of the motor 28 based on the coil temperature obtained in step 1.

The resistance of the coil of the motor 28 is obtained as follows.

When a current passes through the coil of the motor 28, the temperature of the coil increases due to Joule heat, so that the resistance of the coil varies. The resistance of an electric copper wire which is generally used as the coil conductor varies in a temperature range of $-200°$ C.$-150°$ C. in accordance with the following formula:

$$R_t = R_o(1 + 0.043t)$$

where t is a temperature, $R_t$ is a resistance at a temperature t, and $R_o$ is a resistance at 0° C. Thus, step 2 calculates the resistance of the coil, based on the detecting signal, in accordance with, for example, the above formula.

When the resistance of the coil is obtained at a sampling period k in step 2, the resistance of the coil is substituted for Ra in the state equation (3), so that ω(k) and u(k) are calculated, in step 3. Then step 4 calculates the steady-state solution of the Riccati equation (9). Step 5 calculates the optimal gains (K0,K1) based on the steady-state solution of the Riccati equation (9) in accordance with the formula (10). When the optimal gains (K0,K1) are obtained, the process is completed.

The gain decision part 15 supplies the optimal gain K0 to the first feed-back gain part 4 and the optimal gain K1 to the second feed-back gain part 9. The control of the motor is then carried out by using the optimal gains (K0,K1) in the same manner as that in the above case shown in FIGS. 7 and 11.

According to the third embodiment, as the feed-back gains are updated to optimal values based on the detection signal supplied from the temperature sensor 50 every sampling period k, even if the resistance of the coil varies due to temperature of the coil, the control of the motor can be always carried out in a state where the optimal feed-back gains are used in the control system. Thus, the motor 28 can be accurately controlled at a constant speed. That is, the carriage 31 of the scanner 52 is accurately controlled at a constant speed, so that an image on the document 53 can be stably read by the scanner 52.

A description will now be given of a modification of the third embodiment with reference to FIGS. 18 and 19. In this modification, the gain decision part 15 shown in FIG. 14 carries a process shown in FIG. 18.

Figures 18, 19:
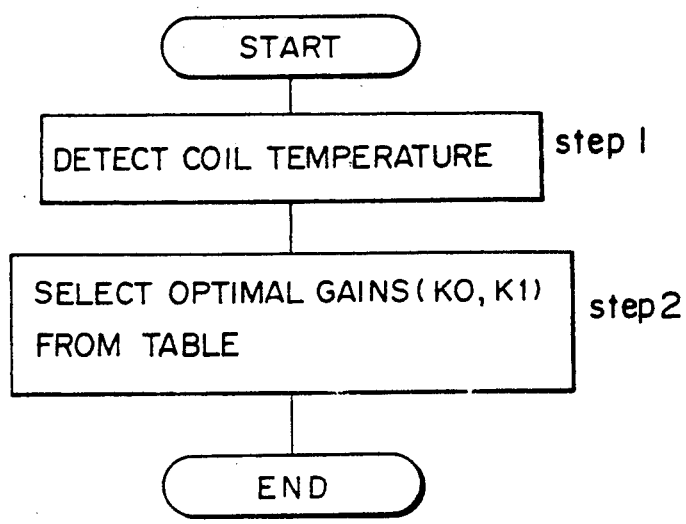
FIG. 18 is a flow chart illustrating another process which can be carried out in the gain decision part shown in FIG. 14.
FIG. 19 is a table illustrating a relationship between temperatures of a coil of the motor and optimal gains in the integral-type optimal regulator shown in FIG. 14.

A relationship between temperatures of the coil of the motor 28 and optimal gains (K0,K1) has been previously obtained and stored, as a table, in either the read only memory 23 (ROM) or the random access memory 24 (RAM), as shown in FIG. 19. The relationship between the temperature of the coil of the motor and the optimal gains (K0,K1) has been previously obtained, for example, in accordance with the above process shown in FIG. 17.

When the integrated value $x_o$ is supplied from the integration part 2 to the gain decision part 15, the process shown in FIG. 18 starts. Step 1 detects a temperature of the coil of the motor 28 based on the detection signal output from the temperature sensor 50. Step 2 then selects, from the table stored in the read only memory 23 (ROM), the optimal gains (K0,K1) corresponding to the temperature detected in step 1. The gain decision part 15 supplies the selected optimal gain K0 to the first feed-back gain part 4 and the selected optimal gain K1 to the second feed-back gain part 9. The control of the motor 28 is carried out by using the selected optimal gains (K0,K1).

Temperatures $t_1, t_2, t_3, \ldots$ are arranged in the table in either decreasing order of absolute value or increasing order thereof. When there is no temperature equal to the detected temperature in the table, the optimal gains (K0,K1) corresponding to the temperature closest to the detected temperature is selected from the table.

According to the above modification, as the feed-back gains are updated to optimal values selected from the table every sampling period k without the calculation thereof, the feed-back gains can be rapidly updated to new optimal gains.

The third embodiment can be also applied to a control system other than the integral-type regulator. In addition, the optimal gains can be also obtained by a process other than a process using the Riccati equation.

The present invention is not limited to the aforementioned embodiments, and variations and modifications may be made without departing from the scope of the claimed invention.

What is claimed is:

1. A control system for a motor for controlling the motor so that a controlled value indicating a speed of said motor is maintained at a predetermined object value indicating a target speed for said motor, said control system comprising:

detecting means for detecting the controlled value indicating a speed of said motor;

setting means for setting the predetermined object value indicating a target speed for said motor;

operating means for obtaining a difference signal representing a difference between the object value and the controlled value;

integrating means, coupled to said operation means, for integrating the difference signal obtained by said operation means and for outputting an integrated value signal;

limiting means, coupled to said integrating means, for outputting a limited value signal when the integrated value signal obtained by said integrating means is equal to or greater than a predetermined limited value and for outputting the integrated value signal from said integrating means when the integrated value signal is less than the predetermined limited value, wherein said limiting means has a table indicating a relationship between object values and predetermined limited values;

selecting means for selecting a predetermined limited value corresponding to the object value supplied from the setting means with reference to said table; and control means, coupled to said limiting means and said motor, for maintaining the controlled value of said motor at the object value based on the integrated value signal or the limited value signal output from said limiting means.

2. A control system as claimed in claim 1, wherein said selecting means has means for selecting from said table one of the predetermined limited values corresponding to a subject value equal to the subject value supplied from the setting means.

3. A control system for a motor for controlling the motor so that a controlled value indicating a speed of said motor is maintained at a predetermined object value indicating a target speed for said motor, said control system comprising:

detecting means for detecting the controlled value indicating a speed of said motor;

setting means for setting the predetermined object value indicating a target speed for said motor;

operating means for obtaining a difference signal representing a difference between the object value and the controlled value;

integrating means, coupled to said operation means, for integrating the difference signal obtained by said operation means and for outputting an integrated value signal;

limiting means, coupled to said integrating means, for outputting a limited value signal when the integrated value signal obtained by said integrating means is equal to or greater than a predetermined limited value and for outputting the integrated value signal from said integrating means when the integrated value signal is less than the predetermined limited value, wherein said limiting means has calculating means for calculating the predetermined limited value corresponding to the object value supplied from the setting means; and control means, coupled to said limiting means and said motor, for maintaining the controlled value of said motor at the object value based on the integrated value signal or the limited value signal output from said limiting means.

4. A control system as claimed in claim 3, wherein said calculating means has simulation means for simulating an operation of said control system in a case where the object value is supplied theret and wherein said calculating means calculates the predetermined limited value based on a result obtained by said simulation means.

5. A control system as claimed in claim 3, further comprising storage means for storing the predetermined limited value calculated by said calculating means, so that the predetermined limited value stored in said storage means is used in said limiting means.

6. A control system for a motor for controlling the motor so that a controlled value indicating a speed of said motor is maintained at a predetermined object value indicating a target speed for said motor, said control system comprising:

detecting means for detecting the controlled value indicating a speed of said motor;

setting means for setting the predetermined object value indicating a target speed for said motor;

operating means for obtaining a difference signal representing a difference between the object value and the controlled value;

integrating means, coupled to said operation means, for integrating the difference signal obtained by said operation means and for outputting an integrated value signal;

limiting means, coupled to said integrating means, for outputting a limited value signal when the integrated value signal obtained by said integrating means is equal to or greater than a predetermined limited value and for outputting the integrated value signal from said integrating means when the integrated value signal is less than the predetermined limited value, wherein the predetermined limited value is set at a value approximately equal to an integrated value which is obtained in a steady-state in which the controlled value of said object is stably maintained at the object value; and control means, coupled to said limiting means and said motor, for maintaining the controlled value of said motor at the object value based on the integrated value signal or the limited value signal output from said limiting means.

7. A control system for a motor for controlling the motor so that a controlled value indicating a speed of said motor is maintained at a predetermined object value indicating a target speed for said motor, said control system comprising:

detecting means for detecting the controlled value indicating a speed of said motor;

setting means for setting the predetermined object value indicating a target speed for said motor;

operating means for obtaining a difference signal representing a difference between the object value and the controlled value;

integrating means, coupled to said operation means, for integrating the difference signal obtained by said operation means and for outputting an integrated value signal;

limiting means, coupled to said integrating means, for outputting a limited value signal when the integrated value signal obtained by said integrating means is equal to or greater than a predetermined limited value and for outputting the integrated value signal from said integrating means when the integrated value signal is less than the predetermined limited value, wherein the predetermined value is set at a value slightly greater than an integrated value which is obtained in a steady-state in which the controlled value of said object is stably maintained at the object value; and control means, coupled to said limiting means and said motor, for maintaining the controlled value of said motor at the object value based on the integrated value signal or the limited value signal output from said limiting means.

8. A control system for controlling a motor so that a controlled value indicating a speed of said motor is maintained at an object value indicating a target speed of said motor supplied from a setting means, said control system comprising:

control data generation means for generating control data based on the object value, the controlled value and a feedback gain signal;

driving means, coupled to said control data generation means, for diving said motor in accordance with the control data generated by said control data generation means;

detection means, coupled to said motor, for detecting a speed of said motor; and decision means, coupled to said control data generating means and said detection means, for determining an optimal gain signal which is optimal for controlling said motor, wherein the optimal gain signal is used as the feedback gain signal in said control data generation means.

9. A control system as claimed in claim 8, wherein said decision means has a first means for obtaining a state equation describing the speed of said motor which is detected by said detection means, and second means for obtaining the optimal gain signal by using the state equation obtained by said first means and a Riccati equation.

10. A control system as claimed in claim 8, wherein said decision means has a table indicating a relationship between speed of said motor and optimal gains, the relation ship being previously obtained, and selecting means for selecting an optimal gain signal corresponding to the state detected by said detection means with reference to said table.

11. A control system as claimed in claim 8, wherein said detection means has temperature detection means for detecting a temperature of a coil of said motor as the state of said motor, and wherein the optimal gain signal is determined based on the temperature detected by said temperature detection means.

12. A control system as claimed in claim 8, wherein said motor is used for moving a carriage in which an optical system of an image scanner is mounted.

13. A control system as claimed in claim 8, wherein said control data generation means has first operation means for obtaining a difference signal representing a difference between the object value and the controlled value, and integrating means for integrating the difference obtained by said operation means and for outputting an integrated value signal; and wherein said control data generation means generates the control data based on the integrated value signal obtained by said integrating means, the optimal gain signal and the controlled value.

14. A control system as claimed in claim 13, wherein said decision means has first decision means foor determining a first optimal gain signal and second decision means for determining a second optimal gain signal, and wherein said control data generation means further comprises first multiplier means for multiplying the integrated value signal by the first optimal gain signal, second multiplier means for multiplying the controlled value by the second optimal gain signal, and second operation means for obtaining the control data based on a first result obtained by said first multiplier means and a second result obtained by said second multipler means.

* * * * *